(12) United States Patent
Kobayashi et al.

(10) Patent No.: US 11,106,226 B2
(45) Date of Patent: *Aug. 31, 2021

(54) VALVE CONTROL DEVICE, VALVE CONTROL SYSTEM, VALVE CONTROL COEFFICIENT CALCULATION METHOD, AND VALVE CONTROL METHOD

(71) Applicant: KANEKO SANGYO CO., LTD., Tokyo (JP)

(72) Inventors: Masayuki Kobayashi, Tokyo (JP); Kazuomi Abe, Tokyo (JP)

(73) Assignee: KANEKO SANGYO CO., LTD., Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 16/493,991

(22) PCT Filed: Jul. 20, 2017

(86) PCT No.: PCT/JP2017/026263
§ 371 (c)(1),
(2) Date: Sep. 13, 2019

(87) PCT Pub. No.: WO2018/167994
PCT Pub. Date: Sep. 20, 2018

(65) Prior Publication Data
US 2020/0033894 A1     Jan. 30, 2020

(30) Foreign Application Priority Data

Mar. 17, 2017 (WO) .................. PCT/JP2017/011015

(51) Int. Cl.
| | |
|---|---|
| *F16K 31/42* | (2006.01) |
| *F16K 31/06* | (2006.01) |
| *G05D 7/06* | (2006.01) |
| *F15B 15/20* | (2006.01) |

(Continued)

(52) U.S. Cl.
CPC ......... *G05D 7/0623* (2013.01); *F15B 15/204* (2013.01); *F16K 1/304* (2013.01);
(Continued)

(58) Field of Classification Search
CPC ......... Y10T 137/7761; Y10T 137/8242; F16K 51/00; F16K 31/0083; F16K 31/0041;
(Continued)

(56) References Cited

U.S. PATENT DOCUMENTS 3,181,165 A * 4/1965 Carpenter .............. G05B 11/00
346/33 R
4,878,417 A * 11/1989 Facon ....................... F15B 9/03
91/363 R (Continued)

FOREIGN PATENT DOCUMENTS

| | | |
|---|---|---|
| CN | 102384303 A | 3/2012 |
| EP | 1593893 A1 | 11/2005 |

(Continued)

OTHER PUBLICATIONS

Office Action dated Apr. 13, 2021, issued for Japanese Patent Application No. 2019-505661 and English translation thereof.

*Primary Examiner* — Matthew W Jellett
(74) *Attorney, Agent, or Firm* — Locke Lord LLP

(57) ABSTRACT

Provided are: a valve control device which is capable of reducing the difference between a set opening amount and the actual opening amount, when executing a partial valve stroke test; a valve control system; a method for calculating a valve control coefficient; and a valve control method. This shut-off valve control device is provided with a microcomputer for controlling the opening and closing of a solenoid valve which supplies air from an air supply source, to a cylinder of an air cylinder for controlling a valve shaft of a shut-off valve, and discharges said air. The microcomputer acquires a set opening amount of the shut-off valve. Furthermore, the microcomputer controls the solenoid valve to a value obtained by dividing the acquired set opening amount by a predetermined coefficient C.

15 Claims, 13 Drawing Sheets

(51) Int. Cl.
*F16K 1/30* (2006.01)
*F16K 37/00* (2006.01)

(52) U.S. Cl.
CPC .............. *F16K 31/06* (2013.01); *F16K 31/42* (2013.01); *F16K 37/0041* (2013.01); *F16K 37/0083* (2013.01); *G05D 7/0635* (2013.01); *Y10T 137/7761* (2015.04); *Y10T 137/8242* (2015.04)

(58) Field of Classification Search
CPC ...... F16K 31/00; F16K 31/42; F16K 31/1635; F16K 31/122; F16K 31/06; F16K 1/304; F15B 2211/8855; F15B 2211/8755; F15B 2211/87; F15B 2211/7052; F15B 2211/6336; F15B 2211/6313; F15B 2211/6309; F15B 2211/327; F15B 2211/30565; F15B 20/00; F15B 19/005; F15B 15/204; F15B 15/066
See application file for complete search history.

(56) References Cited

U.S. PATENT DOCUMENTS

| | | | | |
|---|---|---|---|---|
| 6,186,167 | B1 * | 2/2001 | Grumstrup | F16K 37/0083 137/456 |
| 6,202,680 | B1 * | 3/2001 | Irokawa | F16K 37/00 137/487.5 |
| 7,266,427 | B2 * | 9/2007 | Hansen | G05D 7/005 700/282 |
| 7,650,905 | B2 * | 1/2010 | Kubota | F16K 31/563 137/554 |
| 8,118,276 | B2 * | 2/2012 | Sanders | G05B 19/39 251/129.04 |
| 8,290,631 | B2 * | 10/2012 | Sweeney | F15B 19/005 700/282 |
| 8,807,522 | B2 * | 8/2014 | Okuda | G05B 19/0423 251/129.04 |
| 8,925,895 | B2 * | 1/2015 | Takemoto | F16K 5/0647 251/129.04 |
| 9,465,391 | B2 * | 10/2016 | Grumstrup | F16K 31/42 |
| 2005/0273204 | A1 | 12/2005 | Hansen et al. | |
| 2012/0048396 | A1 | 3/2012 | Takemoto | |
| 2020/0033894 | A1 | 1/2020 | Kobayashi et al. | |

FOREIGN PATENT DOCUMENTS

| | | |
|---|---|---|
| JP | 2005-320986 A | 11/2005 |
| JP | 2009-92110 A | 4/2009 |
| WO | 2018/167994 A1 | 9/2018 |

* cited by examiner

| Setting Poistion(%) | Actual Position(%) | | | | | Ave | Max | Min | Error |
|---|---|---|---|---|---|---|---|---|---|
| | First | Second | Third | Fourth | Fifth | | | | |
| 0% | — | — | — | — | — | 0.00% | — | — | — |
| 25%(without the coefficient.) | 12.28% | 13.69% | 13.92% | 14.14% | 11.61% | 13.13% | 14.14% | 11.61% | -47.49% |
| 25%(with coefficient.) | 19.34% | 19.37% | 19.59% | 20.56% | 19.30% | 19.63% | 20.56% | 19.30% | -21.47% |
| 50%(without the coefficient.) | 39.04% | 38.76% | 38.70% | 38.64% | 38.74% | 38.78% | 39.04% | 38.64% | -22.45% |
| 50%(with coefficient.) | 48.31% | 51.24% | 51.04% | 48.87% | 48.87% | 49.67% | 51.24% | 48.31% | -0.67% |
| 75%(without the coefficient.) | 63.25% | 63.60% | 63.09% | 63.17% | 63.21% | 63.26% | 63.60% | 63.09% | -15.65% |
| 75%(with coefficient.) | 80.56% | 79.96% | 81.89% | 81.72% | 79.46% | 80.72% | 81.89% | 79.46% | 7.62% |
| 100% | — | — | — | — | — | 100.00% | — | — | — |

FIG.9

| Setting Poistion(%) | Actual Position(%) | | | | | Ave | Max | Min | Error |
|---|---|---|---|---|---|---|---|---|---|
| | First | Second | Third | Fourth | Fifth | | | | |
| 0% | — | — | — | — | — | 0.00% | — | — | — |
| 25%(without the coefficient.) | 12.28% | 13.69% | 13.92% | 14.14% | 11.61% | 13.13% | 14.14% | 11.61% | -47.49% |
| 25%(with coefficient.) | 21.09% | 21.19% | 19.95% | 21.92% | 20.92% | 21.01% | 21.92% | 19.95% | -15.94% |
| 50%(without the coefficient.) | 39.04% | 38.76% | 38.70% | 38.64% | 38.74% | 38.78% | 39.04% | 38.64% | -22.45% |
| 50%(with coefficient.) | 52.45% | 52.01% | 51.75% | 52.49% | 51.77% | 52.09% | 52.49% | 51.75% | 4.19% |
| 75%(without the coefficient.) | 63.25% | 63.60% | 63.09% | 63.17% | 63.21% | 63.26% | 63.60% | 63.09% | -15.65% |
| 75%(with coefficient.) | 83.31% | 83.32% | 83.55% | 83.63% | 83.18% | 83.40% | 83.63% | 83.18% | 11.20% |
| 100% | — | — | — | — | — | 100.00% | — | — | — |

FIG.11

VALVE CONTROL DEVICE, VALVE CONTROL SYSTEM, VALVE CONTROL COEFFICIENT CALCULATION METHOD, AND VALVE CONTROL METHOD

CROSS REFERENCE TO RELATED APPLICATIONS

This application is related to co-pending application: "SHUT-OFF VALVE CONTROL DEVICE, SHUT-OFF VALVE CONTROL SYSTEM, METHOD FOR CALCULATING SHUT-OFF VALVE CONTROL COEFFICIENT, AND METHOD FOR CONTROLLING SHUT-OFF VALVE" filed even date herewith in the names of Masayuki Kobayashi and Nobuyoshi Toda as a national phase entry of PCT/JP2017/011015, which application is assigned to the assignee of the present application and is incorporated by reference herein.

TECHNICAL FIELD

The present invention relates to a shut-off valve control device, a shut-off valve control system, a shut-off valve control coefficient calculation method, and a shut-off valve control method.

BACKGROUND ART

A pipeline of oil, gas or the like in a plant facility is provided with a shut-off valve composed of a ball valve or the like in order to shut off the line urgently when an abnormality occurs in the facility. As for the shutoff valve, after installation in the plant facility, the full stroke operation test (also referred to as full valve stroke test or full stroke test) of the shutdown (full open to full close) was conducted about once a year to confirm the presence or absence of failure.

However, closing the shut-off valve completely shuts down the plant and interferes with the normal operation. Therefore, during the normal operation, it was not possible to carry out an operation test of the shut-off valve. Therefore, by performing an operation test to operate the shut-off valve from full opening to a predetermined opening degree (also referred to as partial valve stroke test or partial stroke test), it becomes possible to test the shut-off valve operation without fully closing the shut-off valve, that is, without stopping the plant (for example, refer to Patent Literature 1).

PRIOR ART DOCUMENT

Patent Literature

Patent Literature 1: JP 2009-92110 A

SUMMARY OF INVENTION

Technical Problem

The shut-off valve control system described in Patent Literature 1 includes a shut-off valve, an air cylinder drive valve that opens and closes the shut-off valve, and an electromagnetic valve (solenoid valve) that supplies or exhausts air to a cylinder of the air cylinder drive valve.

In the configuration described above, the shut-off valve is opened or closed by operating the electromagnetic valve by an electric signal and operating the cylinder by supplying or exhausting air into the cylinder by actuation of the electromagnetic valve.

Here, the electromagnetic valve is operated by an electric signal and has a high reaction speed, but the shut-off valve is opened and closed by an air cylinder drive valve operated by air, and operates later than the electromagnetic valve, and the control of the shut-off valve tends to be delayed with respect to the electric signal.

Therefore, when the partial valve stroke test (hereafter referred to as PVST) is performed, even if the opening and closing drive is performed to the opening degree set by the user, there is a problem that a deviation occurs between the set opening degree and the actual opening degree of the shut-off valve.

Accordingly, an object of the present invention is to provide a valve control device, a valve control system, a valve control coefficient calculation method, and a valve control method which can make small the difference of the set opening degree and the actual opening degree, when performing PVST.

Solution to Problem

According to one aspect of the present invention, there is provided a valve control device provided with control means for controlling an electromagnetic valve that supplies and exhausts air from an air supply source to a cylinder of an air cylinder that controls a valve shaft of a valve, including:

set opening degree acquisition means for acquiring a set opening degree of the valve; and opening degree detecting means for detecting an opening degree of the valve, wherein the control means operates the electromagnetic valve until the opening degree detected by the opening degree detection means becomes a value obtained by calculating the set opening degree based on a predetermined coefficient.

Further, according to a second aspect of the invention, there is provided the valve control device as described in the first aspect, wherein the control means operates the electromagnetic valve until the opening degree detected by the opening degree detection means becomes a value obtained by dividing the set opening degree by a predetermined coefficient.

Further, according to a third aspect of the invention, there is provided the valve control device as described in the second aspect, wherein the coefficient is calculated based on a deviation between an actual opening degree of the valve and the set opening degree.

Further, according to a fourth aspect of the invention, there is provided the valve control device as described in the first aspect, wherein the control means operates the electromagnetic valve until the opening degree detected by the opening degree detection means becomes a value determined by an equation based on a predetermined coefficient.

Further, according to a fifth aspect of the invention, there is provided the valve control device as described in the fourth aspect, wherein the coefficient is a coefficient based on the least square method calculated by the actual opening degree of the valve and the set opening degree.

Further, according to a sixth aspect of the present invention, there is provided a valve control system provided with a valve, an air cylinder for controlling rotation of a valve shaft of the valve, and an electromagnetic valve for supplying and exhausting air from an air supply source to a cylinder of the air cylinder, including:

a valve control device as described in any one of the first to fifth aspects.

Further, according to a seventh aspect of the present invention, there is provided the valve control system as described in the sixth aspect, wherein adjustment means for adjusting a flow rate of the air is provided between the electromagnetic valve and the air cylinder.

Further, according to an eighth aspect of the present invention, there is provided a valve control coefficient calculation method of calculating a coefficient by controlling means for controlling an electromagnetic valve that supplies and exhausts air from an air supply source to a cylinder of an air cylinder that controls a valve shaft of the valve, including the steps of:

a preliminary operation step for operating the valve to a predetermined set opening degree;

an actual opening degree detection step for detecting an actual opening degree of the valve in the preliminary operation step;

a deviation calculation step for calculating a deviation of the set opening degree and the actual opening degree; and a coefficient calculation step for calculating the coefficient based on the deviation calculated in the deviation calculation step.

Further, according to a ninth aspect of the present invention, there is provided a valve control coefficient calculation method of calculating a coefficient by controlling means for controlling an electromagnetic valve that supplies and exhausts air from an air supply source to a cylinder of an air cylinder that controls a valve shaft of the valve, comprising the steps of:

a preliminary operation step for operating the valve to a predetermined set opening degree;

an actual opening degree detection step for detecting an actual opening degree of the valve in the preliminary operation step; and a coefficient calculation step for calculating the coefficient based on the least square method calculated by the actual opening degree of the valve and the setting opening degree.

Further, according to a tenth aspect of the present invention, there is provided the valve control coefficient calculation method as described in the eighth or ninth aspect, wherein the preliminary operation step is performed for each of the plurality of set opening degrees.

Further, according to an eleventh aspect of the present invention, there is provided the valve control coefficient calculation method as described in any one of the eighth to tenth aspect, wherein the preliminary operation step operates the valve to the set opening degree a plurality of times per one set opening degree.

Further, according to a twelfth aspect of the present invention, there is provided A valve control method of a valve control device provided with a control device for controlling an electromagnetic valve for supplying and exhausting air from an air supply source to a cylinder of an air cylinder for controlling a valve shaft of a valve, comprising the steps of:

a set opening degree acquisition step for acquiring a set opening degree of the valve;

an opening degree detection step for detecting an opening degree of the valve; and a control step for operating the electromagnetic valve until the opening degree detected in the opening degree detection step becomes a value obtained by calculating the set opening degree based on a predetermined coefficient.

Effect of the Invention

According to the first aspect described above, the control means controls the opening of the electromagnetic valve to a value obtained by calculating the set opening degree based on a predetermined coefficient. Thus, the set opening degree can be changed inside the control means to a value in consideration of the delay of the operation of the shut-off valve by the coefficient. Therefore, the actual opening degree can be controlled to be a value close to the set opening degree, and the deviation between the set opening degree and the actual opening degree can be reduced. In addition, since it can be realized only by electrical control, there is no need for a mechanical mechanism such as extending the needle under a predetermined condition to apply a brake, and the need for additional components for testing is not required.

According to the second aspect, the control means controls the opening of the electromagnetic valve to a value obtained by dividing the set opening degree by a predetermined coefficient. Thus, the set opening degree can be changed inside the control means to a value in consideration of the delay of the operation of the valve by the coefficient. Therefore, the actual opening degree can be controlled to be a value close to the set opening degree, and the deviation between the set opening degree and the actual opening degree can be reduced. In addition, since it can be realized only by electrical control, there is no need for a mechanical mechanism such as extending the needle under a predetermined condition to apply a brake, and the need for additional components for testing is not required.

According to the third aspect, since the coefficient is calculated based on the deviation of the actual opening degree of the valve and the set opening degree, the coefficient can be calculated not from a simple difference but from variations based on a plurality of data, and the coefficients can be made more accurate.

According to the fourth aspect, the control means controls the opening of the electromagnetic valve until the set opening degree becomes a value obtained by an equation based on a predetermined coefficient. Thus, the set opening degree can be changed inside the control means to a value in consideration of the delay of the operation of the valve by the coefficient. Therefore, the actual opening degree can be controlled to be a value close to the set opening degree, and the deviation between the set opening degree and the actual opening degree can be reduced.

According to the fifth aspect, since the coefficient is a coefficient based on the least squares method calculated by the actual opening degree of the valve and the set opening degree, it is possible to obtain a coefficient that is close to the measured value.

According to the sixth aspect, in the valve control system including a valve, an air cylinder for controlling rotation of a valve shaft of the valve, and an electromagnetic valve for supplying and exhausting air from an air supply source to the cylinder of the air cylinder, the deviation between the set opening degree and the actual opening degree can be reduced.

According to the seventh aspect, since the adjustment means for adjusting the flow rate of air is provided between the electromagnetic valve and the air cylinder, the exhausting amount is controlled by throttling the amount of air discharged from the air cylinder by the adjustment means. Therefore, the operating speed of the cylinder is limited, which makes it easy to control the opening degree of the valve. Therefore, the deviation between the set opening degree and the actual opening degree can be reduced.

According to the eighth aspect, first, the preliminary operation step of operating the valve to a predetermined set opening degree is performed, the actual opening degree of the valve in the preliminary operation step is detected, and the deviation between the set opening degree and the actual opening degree is calculated, and the coefficient based on the deviation is calculated. Thus, the coefficient can be calculated based on the deviation of the actual opening degree of the valve and the set opening degree, the coefficient can be calculated from the variation based on a plurality of data, and the coefficient can be calculated accurately. Then, by means of this coefficient, it is possible to change the set opening degree to a value taking into account the delay of the operation of the valve inside the control means. Therefore, the actual opening degree can be controlled to a value close to the set opening degree, and the deviation between the set opening degree and the actual opening degree can be reduced.

According to the ninth aspect, first, a preliminary operation step of operating the valve to a predetermined set opening degree is performed, the actual opening degree of the valve in the preliminary operation process is detected, and a coefficient based on the least square method is calculated by the actual opening degree of the valve and the set opening degree. Thus, a coefficient based on the least square method is calculated by the actual opening degree of the valve and the set opening degree, and the coefficient can be calculated with high accuracy. Then, the coefficient can control the actual opening degree to a value close to the set opening degree, and the deviation between the set opening degree and the actual opening degree can be reduced.

According to the tenth aspect, since the preliminary operation step is performed for each of the plurality of set opening degrees, the accuracy of the coefficient can be further improved.

According to the eleventh aspect, since the preliminary operation step operates the valve to the set opening degrees a plurality of times per one set opening degree. Therefore, more data for calculating the coefficient can be obtained, and the accuracy of the coefficient can be further improved.

According to the twelfth aspect, in the control step, the electromagnetic valve is controlled to open to a value obtained by calculating the set opening degree based on a predetermined coefficient. Thus, By means of the coefficient, the set opening degree can be changed inside the control means to a value taking into account the delay of the operation of the valve. Therefore, the actual opening degree can be controlled to be a value close to the set opening degree, and the deviation between the set opening degree and the actual opening degree can be reduced.

BRIEF DESCRIPTION OF DRAWINGS

FIG. 9 is a table of an example comparing a setting opening degree and an actual opening degree in the case with a coefficient, and a case without a coefficient;

FIG. 11 is a table of an example comparing a setting opening degree and an actual opening degree in the case with a coefficient, and a case without a coefficient;

DESCRIPTION OF EMBODIMENTS

First Embodiment

Hereinafter, a first embodiment of the present invention will be described with reference to drawings.

Figure 1:
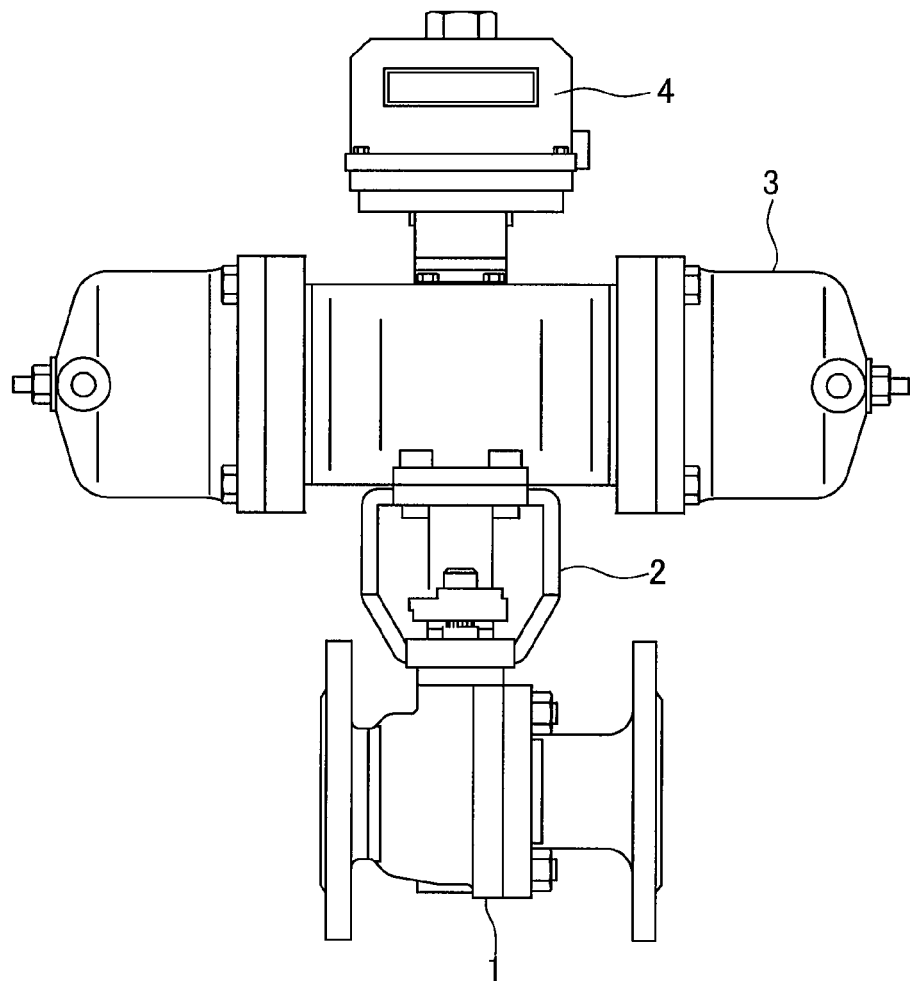
FIG. 1 is a front view of a valve control system having a valve control device according to a first embodiment of the present invention.
Figure 2:
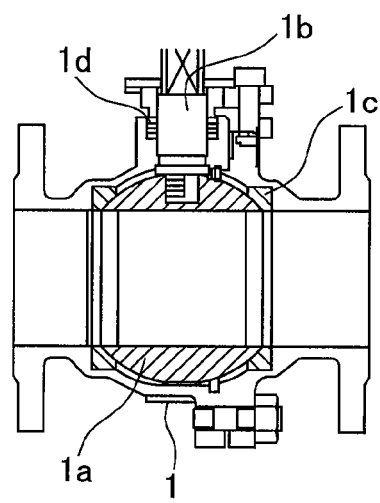
FIG. 2 is a partial cross-sectional view of the valve control system shown in FIG. 1.

FIGS. 1 and 2 show the configuration of a valve control system according to a first embodiment of the present invention, FIG. 1 is a front view, and FIG. 2 is a partial cross-sectional view. A shut-off valve control system as the valve control system includes a shut-off valve 1, an air cylinder 3 attached to the top of the shut-off valve 1 via a fixed yoke 2 and controlling the opening degree of the shut-off valve 1, and an outdoor type or an explosion-proof construction type position box 4 mounted on the top of the air cylinder 3. The position box 4 accommodates a later-described solenoid valve 5, a pressure sensor (electronic digital pressure gauge) 6, a microcontroller (hereinafter referred to as a microcomputer) 7, an opening degree sensor 8, a solenoid valve control power source 10, and the like.

The shutoff valve 1 is, for example, a ball valve having a ball-like valve body 1a, and is connected to a pipeline of a plant facility or the like. An upwardly extending valve stem 1b is connected to the valve body 1a. The valve body 1a is switched between a fully open state (see FIG. 2) and a fully closed state (not shown) when the valve shaft 1b is rotated 90 degrees. A periphery of the valve body 1a is sealed by a sheet packing 1c, and a periphery of the valve shaft 1b is sealed by a gland packing 1d. Incidentally, in the present embodiment, an example of an air cylinder type on-off valve will be described as the shut-off valve 1 which is normally opened and closed as required. On the contrary, it may be a type of valve that is normally closed and opened as required.

Figure 3:
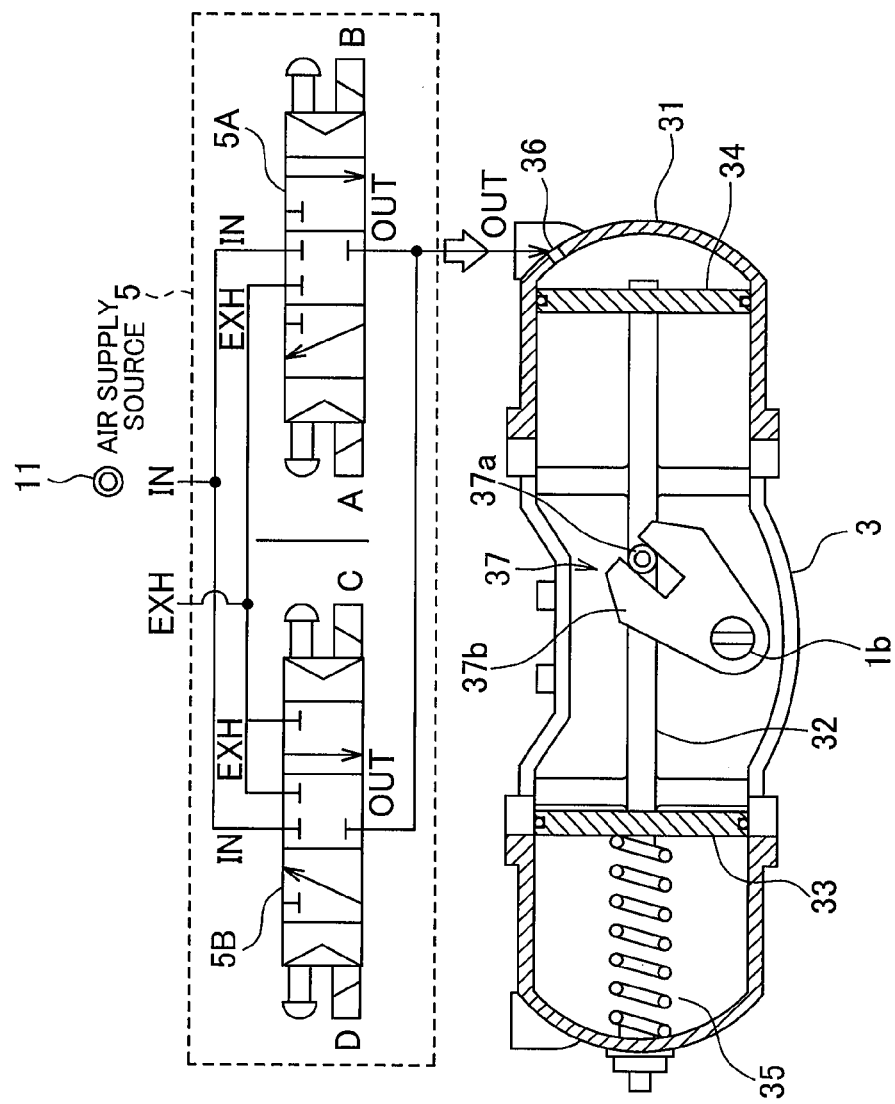
FIG. 3 is an explanatory drawing showing the structures of a solenoid valve and an air cylinder shown in FIG. 1.

As shown in FIG. 3, the air cylinder 3 is provided with a pair of pistons 33 and 34 connected by a piston rod 32 in a single-acting pneumatic cylinder 31. One piston 33 is urged to slide in a valve closing direction (the right direction in FIG. 3) by the urging force of a coil spring 35 disposed in one end of the cylinder 31. The other piston 34 is urged to slide toward an valve-opening direction (the left direction in FIG. 2) against the biasing force of the coil spring 35 by the air supplied from an outlet port OUT of the solenoid valve 5 connected to an air inlet 36 provided at the other end of the cylinder 31. The piston rod 32 is provided with a transmission mechanism 37 that converts a reciprocating motion of the piston rod 32 into a rotational motion and transmits the rotational motion to the valve shaft 1b. The transmission mechanism 37 has an engagement pin 37a protruding from the piston rod 32, and a bifurcated engagement piece 37b attached to an upper end of the valve shaft 1b. A tip of the bifurcated engagement piece 37b is engaged with the engagement pin 37a, and the bifurcated engagement piece 37b is rotated by the lateral movement of the engagement pin 37a, whereby the valve shaft 1b is rotated 90 degrees. Incidentally, the air cylinder 3 is not limited to a single-acting cylinder as illustrated, but may be another type such as a double-acting cylinder.

The solenoid valve 5 as an electromagnetic valve incorporates two three-way solenoid valves, a large flow three-way solenoid valve 5A and a small flow three-way solenoid valve 5B, in one body. The large flow three-way solenoid valve 5A has solenoids A and B for valve switching, has a large effective cross-sectional area of the valve, and rapidly drives the air cylinder 3 in a valve closing direction to shut off the shut-off valve 1 urgently when an abnormality occurs in the pipeline. The small flow three-way solenoid valve 5B has solenoids C and D for switching the valve, and the effective cross-sectional area of the valve is smaller than the large flow three-way solenoid valve 5A, and is for operation test used in an operation test of the system. An inlet port IN, an outlet port OUT and an exhaust port EXH of each of the large flow three-way solenoid valve 5A and the small flow three-way solenoid valve 5B are respectively connected to each other, and are respectively common ones provided in the body. The solenoid valve 5 is connected to the air from the air supply source 11 located outside the position box 4 and supplies the air from the common inlet port IN via the large flow three-way solenoid valve 5A or the small flow three-way solenoid valve 5B to the cylinder 31 of the air cylinder 3, and exhausts the air in the cylinder 31 to the atmosphere from the common outlet port OUT via the common exhaust port EXH via the large flow three-way solenoid valve 5A or the small flow three-way solenoid valve 5B.

Incidentally, in the present embodiment, although the solenoid valve 5 is described as having the two-system three-way valve as described above, the solenoid valve 5 may has one-system. That is, one-system of three-way valve may be used for both emergency shut-off and operation test. Also, the solenoid valve 5 is not limited to the illustrated three-way solenoid valve of the all-port block three-position double solenoid but may be another type such as a two-position three-way solenoid valve.

Figure 4:
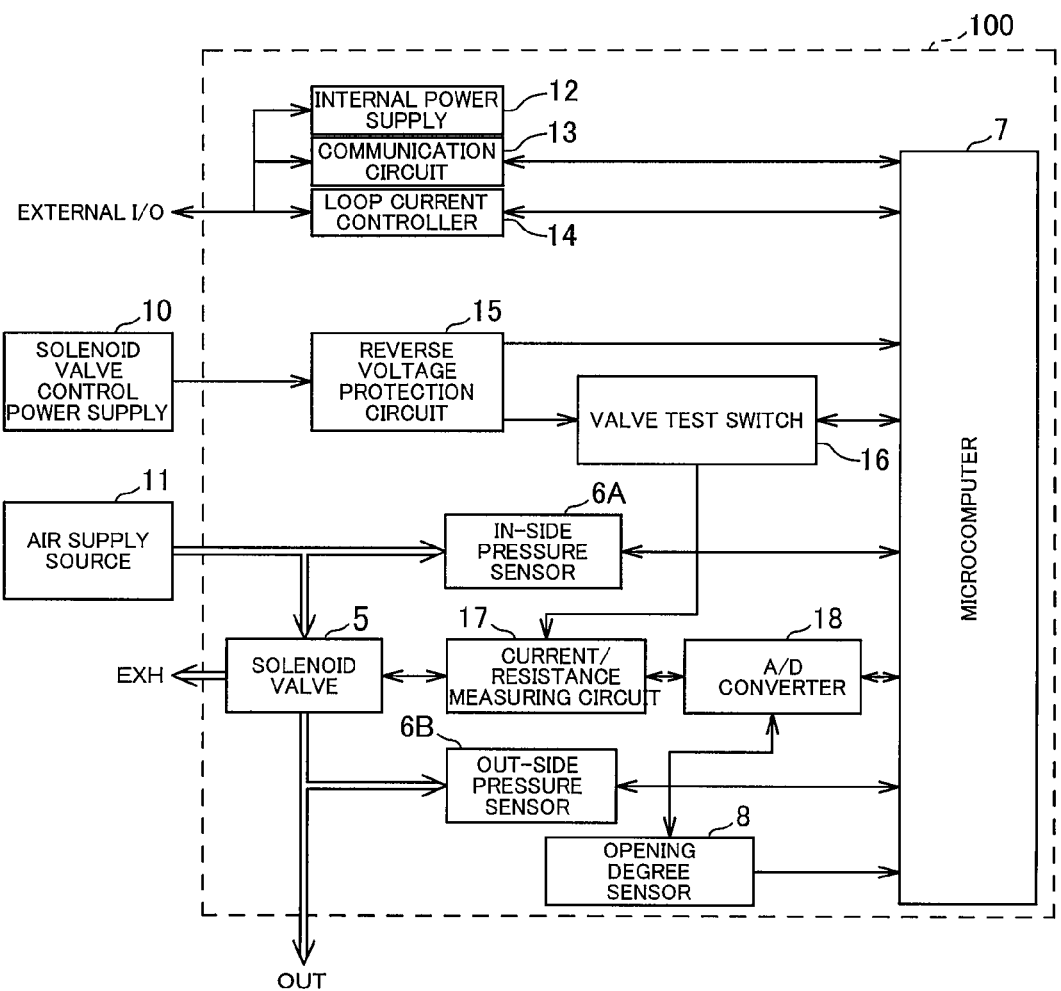
FIG. 4 is a block diagram showing a functional structure of the valve control device shown in FIG. 1.

FIG. 4 is a block diagram showing an electrical configuration of the shut-off valve control device as the valve control device according to the present embodiment. The shut-off valve control device 100 includes a solenoid valve 5, a pressure sensor 6, a microcomputer 7, an opening degree sensor 8, an internal power supply 12, a communication circuit 13, a loop current controller 14, a reverse voltage protection circuit 15, a valve test switch 16, a current/resistance measuring circuit 17, and an A/D converter 18.

The pressure sensor 6 includes an IN-side pressure sensor 6A and an OUT-side pressure sensor 6B. The IN-side pressure sensor 6A measures the pressure supplied from the air supply source 11 to the solenoid valve 5. The OUT side pressure sensor 6B measures the pressure on the OUT side of the solenoid valve 5 and the internal pressure of the cylinder 31.

The microcomputer 7 includes a central processing unit (CPU), a memory such as a read only memory (ROM) and a random access memory (RAM), and controls the entire operation of the shut-off valve control device 100 with a program executed by the CPU. The microcomputer 7 performs, for example, control of the solenoid valve 5 at the time of PVST described above, calculation operation of a coefficient to be used at the time of PVST, and the like. That is, the microcomputer 7 functions as control means for controlling the opening and closing of the solenoid valve 5 (electromagnetic valve).

The opening degree sensor 8 as opening degree detection means is composed, for example of a potentiometer etc., and detects the actual opening degree of the shut-off valve 1 by measuring an angle of the valve shaft 1b.

The internal power supply 12 is a power supply for driving the shut-off valve control device 100. The communication circuit 13 performs data transmission/reception with external input/output and the microcomputer 7. The loop current controller 14 performs predetermined output current control under the control of the microcomputer 7.

The reverse voltage protection circuit 15 protects an internal circuit such as the microcomputer 7 from a reverse voltage generated when a solenoid valve control power supply 10 is reversely connected. The valve test switch 16 is a switch for performing the PVST and a full valve stroke test (hereinafter referred to as FVST) of the shut-off valve using the solenoid valve 5. The current/resistance measuring circuit 17 measures the current when the solenoid valve 5 is energized, and measures the resistance when the solenoid valve 5 is not energized. The A/D converter 18 converts analog signals of the measurement result of the current/resistance measuring circuit 17 and the measurement result of the opening degree sensor 8 into digital signals.

Next, a normal operation of the shut-off valve control system will be described. First, the solenoid valve 5 for switching the air cylinder 3 has two valves (the large flow three-way solenoid valve 5A and the small flow three-way solenoid valve 5B) which are three-way valves in one body. Therefore, the large flow three-way solenoid valve 5A is usually used. At this time, the small flow three-way solenoid valve 5B is controlled to be in a power stop state, and is in the all-port block state in which all three ports are closed. The large flow three-way solenoid valve 5A and the small flow three-way solenoid valve 5B are electrically interlocked by the control of the microcomputer 7 so that when one solenoid valve is energized, the other solenoid valve is in the power stop state. Therefore, both will not be energized at the same time.

When the solenoid A of the large flow three-way solenoid valve 5A is in the power stop state and power is supplied to the solenoid B, the air from the air supply source 11 flows from the common inlet port IN of the solenoid valve 5 through the large flow three-way solenoid valve 5A and is supplied to the cylinder 31 from the inlet 36 via the common outlet port OUT. Then, the piston 34 slides in the left direction, and the shut-off valve 1 is fully opened. As a result, while the solenoid B is energized, operation of the pipeline is enabled. Incidentally, the large flow three-way solenoid valve 5A is electrically interlocked by the control of the microcomputer 7 so that the other solenoid is not energized while one solenoid is energized.

Next, when the microcomputer 7 energizes the solenoid A based on an abnormality detection signal of the plant facility or an operation signal of an emergency shut-off switch (not shown), the air in the cylinder 31 is exhausted from the common exhaust port EXH to the atmosphere from the outlet port OUT of the solenoid valve 5 via the large flow rate three-way solenoid valve 5A. Then, the piston 34 slides from left to right due to the spring load, the valve shaft 1b rotates 90 degrees, and the shut-off valve 1 is fully closed. As a result, while the solenoid A is energized, the pipeline is shut off urgently.

In the above operation, either solenoid A or B is controlled to be energized at all times, but as another operation example, if the solenoid A remains in the power stop state and the solenoid B is energized to make the shut-off valve in the fully opened state, and then the solenoid B also becomes in the power stop state, the large flow three-way solenoid valve 5A is in the all port block state, and the shut-off valve 1 maintains in the fully opened state. Further, if the solenoid B remains in the power stop state and the solenoid A is energized to make the shut-off valve in the fully closed state, and then the solenoid A is also in the power stop state, the large flow three-way solenoid valve 5A is in the all port block state, and the shut-off valve 1 maintains in the fully closed state. In this manner, power consumption can be reduced by controlling both solenoids A and B in the power stop state after the shut-off valve is in the fully opened state or in the fully closed state.

Figure 5:
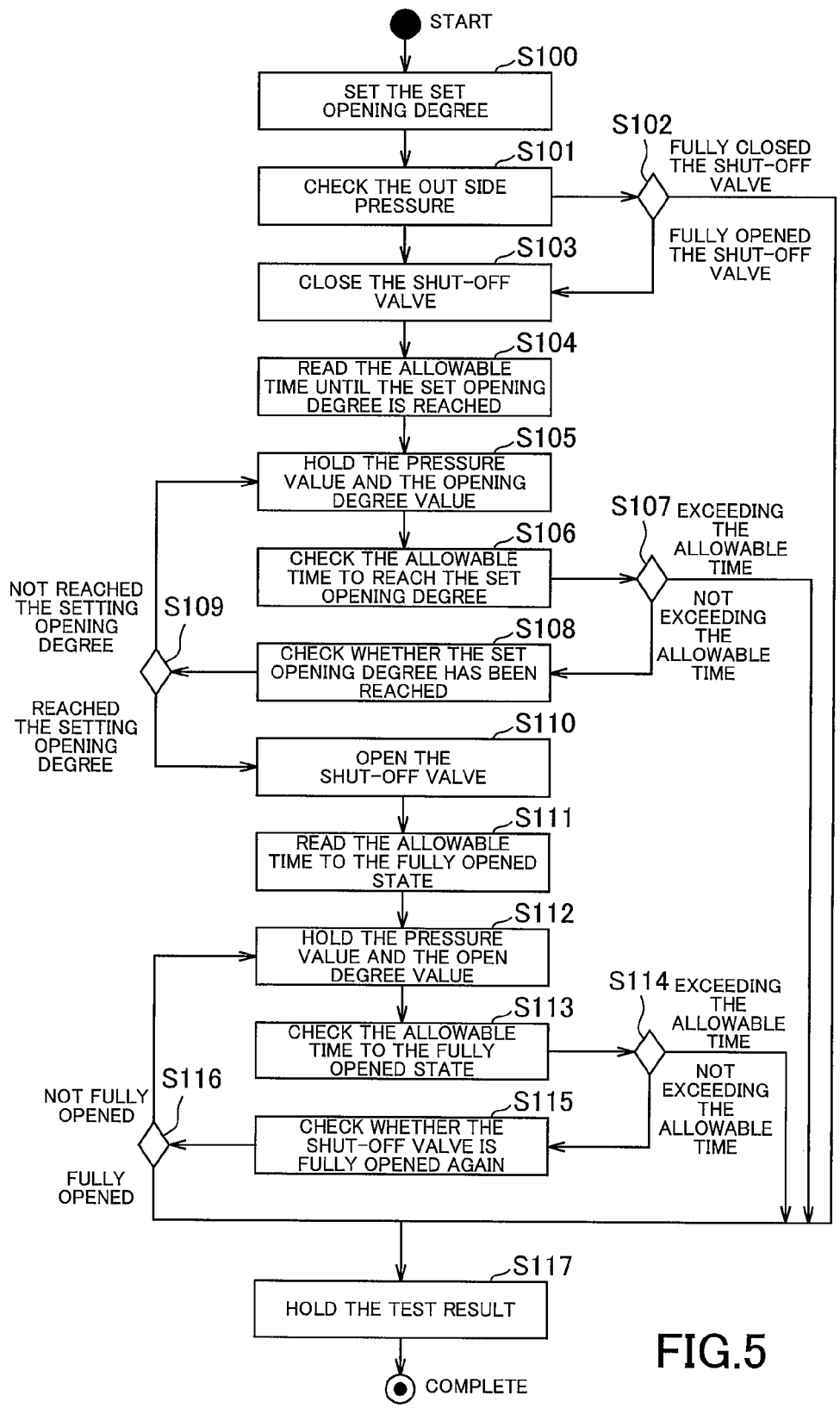
FIG. 5 is a flowchart of an operation at the time of a setting operation test (PVST) including prediction of a failure of the valve control device shown in FIG. 1.

Next, an operation at the time of setting operation test (PVST) including prediction of a failure will be described with reference to a flowchart of FIG. 5. At the time of operation test, the small flow three-way solenoid valve 5B is used. Although FIG. 5 is described as PVST, it can also be applied to FVST by fully closing the set opening degree. Incidentally, this flowchart is executed by the microcomputer 7.

First, the set opening degree of the shut-off valve 1 is set (step S100). The set opening degree is acquired by the microcomputer 7 via the communication circuit 13 and the like, and is set in the microcomputer 7. That is, the microcomputer 7 functions as set opening degree acquisition means that acquires the set opening degree of the shut-off valve 1. Then, for example, the valve test switch 16 is operated, and the following operation is performed.

Next, the detection value of the OUT side pressure sensor 6B is acquired and checked (step S101). If the shut-off valve 1 is fully closed (step S102: the shut-off valve 1 is fully closed), the test result is held in the memory in the microcomputer 7 (step S117) to complete the test. Since the OUT side pressure sensor 6B can measure the internal pressure of the cylinder 31, by setting the position of the piston 34 when the shut-off valve 1 is fully closed, the position of the piston 34 when the shut-off valve 1 is fully opened, and the internal pressure value of the cylinder 31 in each case in the microcomputer 7 preliminary, whether the shut-off valve 1 is fully closed or fully opened can be determined.

On the other hand, if the shut-off valve 1 is fully opened (step S102: the shutoff valve 1 is fully opened), the shut-off valve 1 is closed (step S103). Specifically, the microcomputer 7 energizes the solenoid C of the small flow three-way solenoid valve 5B, and the air in the cylinder 31 is exhausted from the common exhaust port EXH to the atmosphere from the outlet port OUT of the solenoid valve 5 via the small flow rate three-way solenoid valve 5B. Then, the piston 34 slides from left to right due to the spring load.

Next, the allowable time until the set opening degree is reached is read from the internal memory or the like (step S104). The current detection value of the OUT side pressure sensor 6B and the detection value of the opening degree sensor 8 are held in the internal memory or the like (step S105). The allowable time until reaching the set opening degree is compared (checked) with the elapsed time from the start of closing the shut-off valve in step S103 to the present time (step S106). Incidentally, the allowable time is set preliminary in the microcomputer 7. Further, the elapsed time may be measured by a timer or the like built in the microcomputer 7.

If the result of comparison in step S106 indicates that the allowable time is exceeded (step S107: exceeding the allowable time), the test result is held in the memory in the microcomputer 7 (step S117) to complete the test. On the other hand, if the result of the comparison in step S106 does not exceed the allowable time (step S107: not exceeding the allowable time), whether the set opening degree has been reached is checked (step S108). As a result of comparison in step S106, if the allowable time is exceeded, it is determined that an abnormality such as sticking of the shut-off valve 1 is found as a result of the test, and the result is held.

Next, as a result of checking the set opening degree in step S108, if the set opening degree has not been reached (step S109: the setting opening degree has not been reached), the process returns to step S105, and step S105 and subsequent steps are executed again. On the other hand, if the set opening degree is reached as a result of checking the set opening degree in step S108 (step S109: reached the set opening degree), the shut-off valve 1 is opened (step S110).

When step S110 is executed, the microcomputer 7 makes the solenoid C into the power stop state, and makes the solenoid D energized. Then, the air from the air supply source 11 is supplied from the common inlet port IN of the solenoid valve 5 via the small flow rate three-way solenoid valve 5B to the cylinder 31 from the inlet 36 via the common outlet port OUT. Then, the piston 34 slides in the left direction, and the shut-off valve 1 goes to the fully opened state.

Next, the allowable time from the preliminary set opening degree to the fully opened state is read from the internal memory or the like (step S111). The current detection value of the OUT side pressure sensor 6B and the detection value of the opening degree sensor 8 are held in the internal memory or the like (step S112). The allowable time to the fully opened state is compared (checked) with the elapsed time from the start of opening the shut-off valve 1 in step S110 to the present time (step S113).

As a result of comparison in step S113, if the allowable time is exceeded (step S114: exceeding the allowable time), the test result is held in the memory in the microcomputer 7

(step S117) and the test is completed. On the other hand, as a result of comparison in step S113, if the allowable time is not exceeded (step S114: not exceeding the allowable time), whether the shut-off valve 1 is fully opened again is checked (step S115). As a result of comparison in step S113, if the allowable time is exceeded, it is determined that some abnormality is found when returning from the set opening degree to the fully opened state, and the result is held.

Next, as a result of checking whether the shut-off valve is fully opened in step S115, if not fully opened (step S116: not fully opened), the process returns to step S112, and step S112 and subsequent steps are executed again. On the other hand, as a result of checking whether the shut-off valve is fully opened in step S115, if fully opened (step S116: fully opened), the test result is held in the memory in the microcomputer 7 (step S117) to complete the test. That is, when the steps S114, S115, S116, and S117 are performed in order, it can be determined that the test has ended normally.

Figure 6:
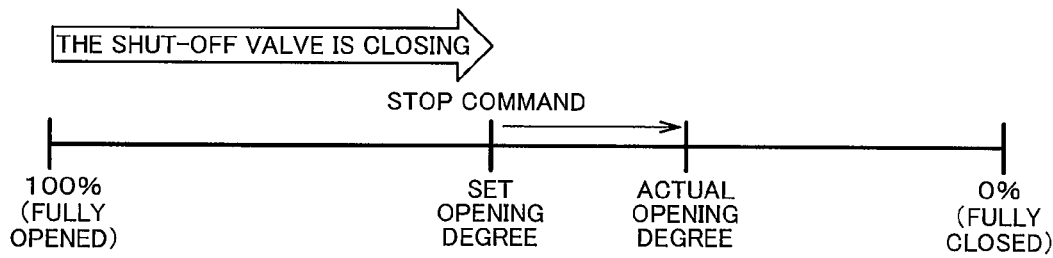
FIG. 6 is an explanatory view explaining a problem in conventional PVST.

In the above-mentioned test (PVST), the solenoid valve 5 is operated by an electrical signal and the reaction speed is fast. However, since the shutoff valve 1 is opened and closed by the air cylinder 3 operated by air, the shut-off valve 1 is operated later than the solenoid valve 5. As a result, the control of the shut-off valve 1 tends to be delayed with respect to the electrical signal. Therefore, even if the shut-off valve 1 is driven to close to the opening degree (set opening degree) set by the user from the fully opened state during PVST, the shut-off valve 1 stops (or shifts to open control) later than the solenoid valve 5 stops (or shifts to open control) at the time of detection of the set opening degree. Therefore, the shut-off valve 1 is closed more than the set opening degree, and a deviation occurs between the set opening degree and the actual opening degree of the shut-off valve 1 (see FIG. 6).

Therefore, in the present embodiment, the microcomputer 7 performs an operation based on a predetermined coefficient on the set opening degree set by the user, and changes the set opening degree to a value larger than the original value. Thus, the shut-off valve 1 is apparently stopped before the set opening degree, and the actual opening degree approaches the value set by the user (see FIG. 7). FIG. 8 shows a flowchart of the above-described operation of calculating the predetermined coefficient (a method of calculating the shut-off valve control coefficient).

First, as an initial setting, the solenoid valve 5 is operated to cause the microcomputer 7 to recognize the detection values of the opening degree sensor 8 when the shut-off valve 1 is fully opened and fully closed (step S201). Next, PVST is executed by the operation shown in FIG. 5 (step S202). This PVST is executed in the conventional manner without using coefficients yet. Further, it is preferable to execute PVST a plurality of times by changing the set opening degrees. Furthermore, it is preferable to execute PVST multiple times per one set opening degree.

Next, the actual opening degree of the shut-off valve 1 in the PVST executed in step S202 is acquired for each set opening degree (step S203). Next, the deviation α between each set opening degree and the actual opening degree is determined (step S204), and the average of the deviation (standard deviation) β is determined (step S205). Then, the coefficient C is calculated as C=1−β from the standard deviation β obtained in step S205 (step S206). That is, the coefficient C is calculated based on the deviation of the actual opening degree of the shut-off valve 1 and the set opening degree.

Figure 7:
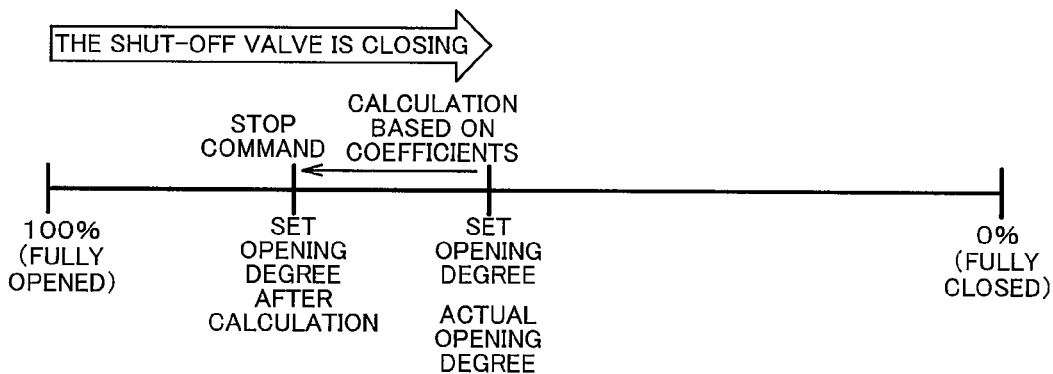
FIG. 7 is an explanatory view explaining an operation principle of a valve control device according to the first embodiment of the present invention.
Figure 8:
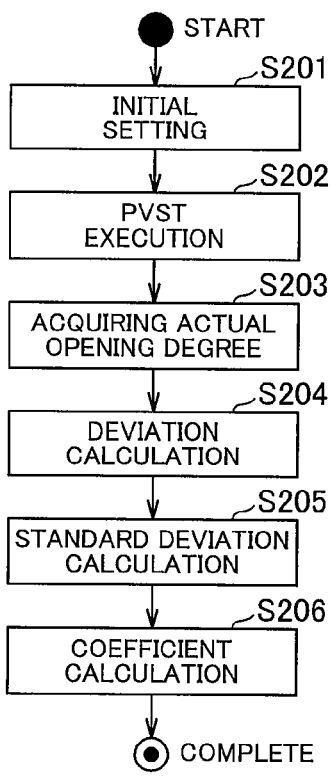
FIG. 8 is a flowchart of coefficient calculation operation of the valve control device shown in FIG. 1.

According to the flowchart of FIG. 7, step S202 is a preliminary operation step, step S203 is an actual opening degree detection step, steps S204 and S205 are deviation calculation steps, and step S206 is a coefficient calculation step.

FIG. 9 shows the table which compared the examples of the set opening degree (Setting Position) and the actual opening degree (Actual Position) at the time of performing PVST by the case with a coefficient and the case without a coefficient. In the case of FIG. 9, PVST was executed five times for each of three set opening degrees of 25%, 50%, and 75%, with and without the coefficient.

In FIG. 9, the coefficient is calculated based on data in the case without the coefficient as described above. In FIG. 9, the average (Ave) of the actual opening degree is calculated for each of the set opening degree 25%, 50%, and 75%, and the deviation α between the average and the set opening degree is calculated. Then, the standard deviation β is calculated by adding the deviation α calculated for each of the set opening degree 25%, 50%, and 75%, and the coefficient C is calculated by 1−β.

The coefficient C calculated in FIG. 9 is 0.817308. In the case of 25%, the set opening degree divided by the coefficient C is 30.588224, which is a value larger than the set opening degree. Similarly, in the case of the setting opening degree 50%, it becomes 61.176446, and in the case of the setting opening degree 75% it becomes 91.764671, which are values larger than the setting opening degree. When the setting opening degree becomes a large value, it is in front of the setting opening degree because control is performed from the fully opened state (100%) to the closing direction when executing PVST.

If PVST is performed using a value instead of the set opening degree obtained in this way, as shown in the row with the coefficient in FIG. 9, the actual opening degree becomes a value close to the set opening degree with any set opening degree, and it became clear that the error with coefficient was smaller than the error without coefficient.

The coefficient C calculated by the flowchart of FIG. 8 reads the allowable time until the opening degree based on the value of the division result by the coefficient C is reached instead of the set opening degree in step S104 of FIG. 5. Steps S106, S108, etc. are also determined using the opening degree based on the division result instead of the set opening degree. That is, the microcomputer 7 energizes the solenoid C of the small flow three-way solenoid valve 5B of the solenoid valve 5 (electromagnetic valve), and air in the cylinder 31 exhausts (to operate) from the outlet port OUT of the solenoid valve 5 via the small flow three-way solenoid valve 5B and from the common exhaust port EXH until the opening degree detected by the opening degree sensor 8 (opening degree detection means) becomes a value obtained by dividing the acquired set opening degree by a predetermined coefficient C.

Therefore, step S100 functions as a set opening degree acquisition process, step S105 functions as an opening degree detection process, and steps S108 and S109 function as a control process.

According to the present embodiment, the shut-off valve control device 100 is provided with the microcomputer 7 that controls the opening and closing of the solenoid valve 5 that supplies and exhausts air from the air supply source 11 to the cylinder 31 of the air cylinder 3 that controls a valve shaft 1b of the shut-off valve 1. The microcomputer 7 acquires the set opening degree of the shut-off valve 1. Then, the microcomputer 7 operates the solenoid valve 5 to a value obtained by dividing the acquired set opening degree by a predetermined coefficient C. Thus, the set opening degree can be changed by the coefficient C inside the microcomputer 7 to a value in consideration of the delay of the operation of the shut-off valve 1. Therefore, the actual opening degree can be controlled to a value close to the set opening degree, and the deviation between the set opening degree and the actual opening degree can be reduced. In addition, since it can be realized only by electrical control, there is no need for a mechanical mechanism such as extending the needle under a predetermined condition to apply a brake, and the need for additional components for testing is not required.

Further, since the coefficient C is calculated based on the deviation of the actual opening degree of the shut-off valve 1 and the set opening degree, the coefficient can be calculated not from a simple difference but from variations based on a plurality of data, and the coefficients can be made more accurate.

Second Embodiment

Next, a shut-off valve control system according to a second embodiment of the present invention will be described with reference to FIGS. 10 and 11. Incidentally, the same components as those of the first embodiment described above are denoted by the same reference signs and the description thereof will be omitted.

In the present embodiment, the configuration of the shut-off valve control system is the same as that shown in FIGS. 1 to 4. In the present embodiment, the calculation method of the coefficient and the correction equation using the coefficient are different. Further, the operation at the time of operation test (PVST) at the time of setting including the prediction of failure (flowchart of FIG. 5) is also the same as that of the first embodiment.

Figure 10:
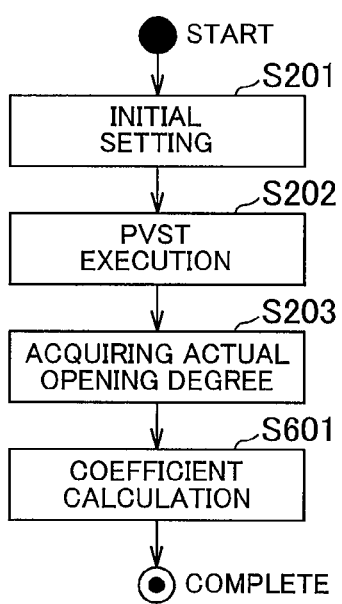
FIG. 10 is a flowchart of coefficient calculation operation of the valve control device according to a second embodiment of the present invention.

FIG. 10 shows a flowchart of the calculation operation of the predetermined coefficient (the shutoff valve control coefficient calculation method) according to the present embodiment. Steps S201 to S203 in FIG. 10 are the same as in FIG. 8. In step S601, which is advanced from step S203, a coefficient is calculated based on the actual opening degree acquired in step S203 and the set opening degree. Assuming that the opening degree after calculation is y and the set opening degree before calculation is x, the formula for calculating the setting opening degree based on the coefficient in the present embodiment is expressed by the following equation (1).

$$y = ax + b \quad (1)$$

In equation (1), a and b are coefficients. The coefficient a is the gain of x in calculating y, and the coefficient b is the offset of x in calculating y. These coefficients are obtained by the following equations (2) and (3).

$$a = \frac{n \sum_{k=1}^{n} x_k y_k - \sum_{k=1}^{n} x_k \sum_{k=1}^{n} y_k}{n \sum_{k=1}^{k} x_k^2 - \left(\sum_{k=1}^{k} x_k\right)^2} \quad (2)$$

$$b = \frac{\sum_{k=1}^{k} x_k^2 \sum_{k=1}^{n} y_k - \sum_{k=1}^{n} x_k y_k \sum_{k=1}^{n} x_k}{n \sum_{k=1}^{k} x_k^2 - \left(\sum_{k=1}^{k} x_k\right)^2} \quad (3)$$

In the equations (2) and (3), n is the number of data sets of the actual opening degree and the set opening degree (number of PVST executions performed to calculate the coefficient) obtained by executing PVST for a plurality of types of set openings, or by executing PVST a plurality of times for one set opening degree.

The calculation of the set opening degree according to the present embodiment, that is, the linear equation represented by the equation (1) is based on the least square method. The coefficients a and b calculated by the equations (2) and (3) are coefficients based on this least square method. Incidentally, in the present embodiment, although the equation (1) is a linear equation, it may be a high-order equation such as a quadratic equation or a cubic equation. In that case, the equations (2) and (3) may be changed as appropriate.

The table which compared the example of the setting opening degree (Setting Position) and actual opening degree (Actual Position) at the time of performing PVST by the case with and without a coefficient in the present embodiment is shown in FIG. 11. In the case of FIG. 11, PVST was performed five times for each of the three set opening degrees of 25%, 50%, and 75%, with and without the coefficient.

In FIG. 11, the coefficients a and b are calculated based on data in the case of no coefficient as described above. If PVST is performed using a value instead of the set opening degree obtained in this way, as shown in the line with the coefficient in FIG. 11, it became clear that the actual opening degree becomes a value close to the set opening degree at any set opening degree, and the error is smaller with the coefficient than without the coefficient.

In step S104 of FIG. 5, an allowable time until reaching the opening degree based on the value of the result of division by the coefficients a and b calculated in the flowchart in FIG. 10 is read instead of the set opening degree. Steps S106, S108, etc. are also determined by the opening degree based on the division result instead of the set opening degree. That is, the microcomputer 7 energizes the solenoid C of the small flow three-way solenoid valve 5B of the solenoid valve 5 (electromagnetic valve) until the opening degree detected by the opening degree sensor 8 (opening degree detection means) becomes a value obtained by calculating the acquired set opening degree by equation (1). The air in the cylinder 31 is exhausted (operated) to the atmosphere from the common exhaust port EXH from the outlet port OUT of the solenoid valve 5 via the small flow rate three-way solenoid valve 5B.

According to the present embodiment, the valve control device 100 controls the opening and closing of the solenoid valve 5 that supplies and exhausts air from the air supply source 11 to the cylinder 31 of the air cylinder 3 that controls the valve shaft 1b of the shutoff valve 1. The microcomputer 7 acquires the set opening degree of the shut-off valve 1. Then, the microcomputer 7 operates the solenoid valve 5 to a value calculated by a linear equation based on predetermined coefficients a and b for the acquired set opening degree. Thus, the set opening degree can be changed inside the microcomputer 7 to a value taking into account the delay of the operation of the shut-off valve 1 by the coefficients a and b. Therefore, the actual opening degree can be controlled to a value close to the set opening degree, and the deviation between the set opening degree and the actual opening degree can be reduced. In addition, since it can be realized only by electrical control, there is no need for a mechanical mechanism such as extending the needle under a predetermined condition to apply a brake, and the need for additional components for testing is not required.

Further, since the coefficients a and b are coefficients based on the least square method calculated by the actual opening degree of the shut-off valve 1, the coefficients that are close to the actual measurement values can be obtained.

Third Embodiment

Next, a shut-off valve control system according to a third embodiment of the present invention will be described with reference to FIGS. 12 and 13. Incidentally, the same components as those in the first and second embodiments described above are denoted by the same reference signs and the description thereof will be omitted.

In the present embodiment, the operation of the shut-off valve control system is different. The operation at the time of operation test (PVST) at the time of setting including prediction of failure in the present embodiment will be described with reference to the flowchart of FIG. 12.

Figure 12:
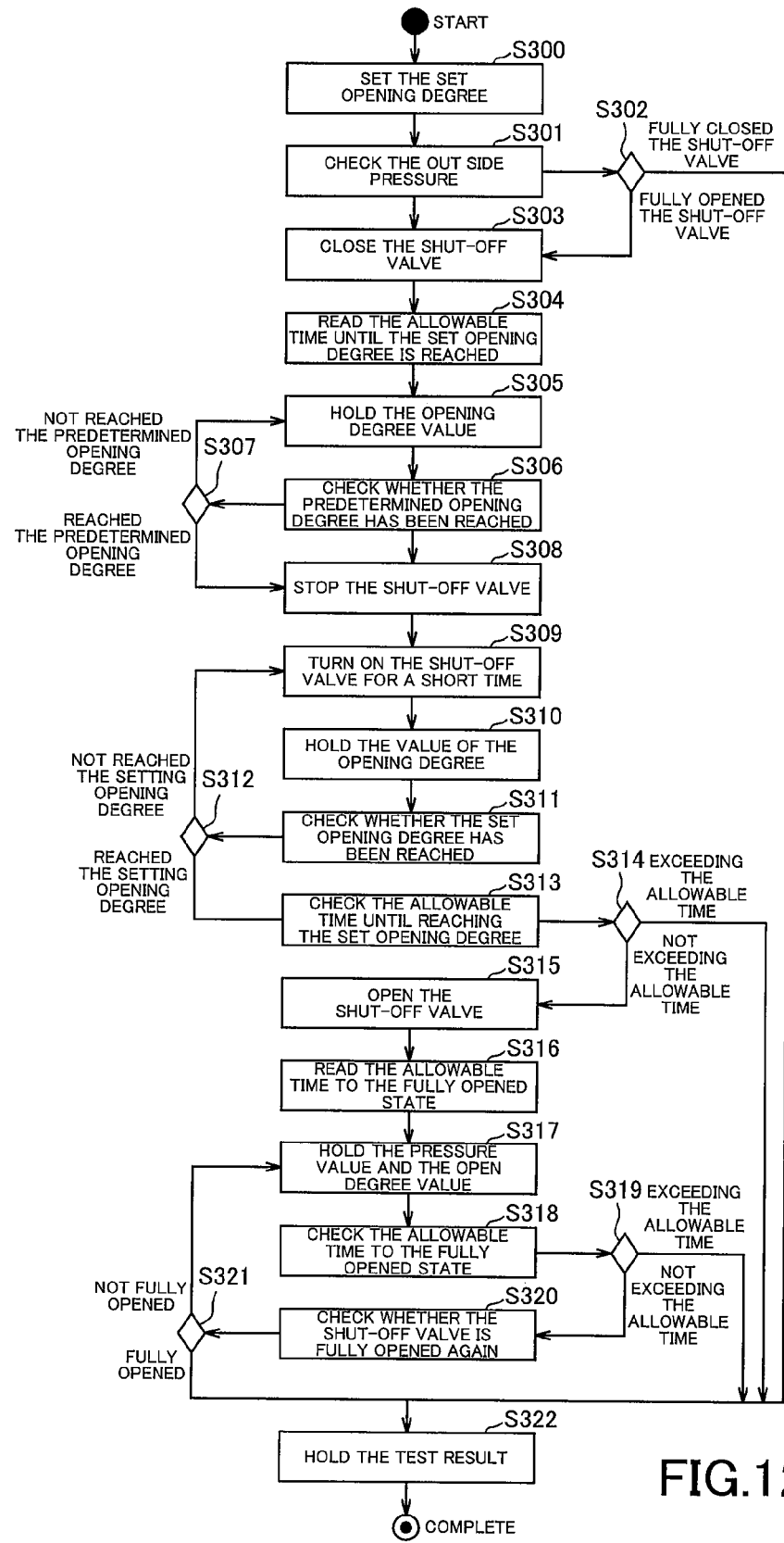
FIG. 12 is a flowchart of an operation at the time of a setting operation test (PVST) including prediction of a failure of the valve control device according to a third embodiment of the present invention.

In the flowchart of FIG. 12, steps S300 to S304 are the same as steps S100 to S104 of the flowchart of FIG. 5. In step S305, which is advanced from step S304, the detected value (actual opening degree) of the opening degree sensor 8 is held in an internal memory or the like, and whether the detected value has reached a predetermined opening degree is checked (step S306).

The predetermined opening degree is, for example, a value of about 120% of the set opening degree. If the predetermined opening degree is too large, the number of times to turn on the shut-off valve for a short time, which will be described later, increases, and the test time becomes longer. On the other hand, if the predetermined opening degree is too close to the set opening degree, as described in the Technical Problem, the set opening degree may be exceeded by delay of the operation of the shut-off valve 1. So, in the present embodiment, it is desirable that the predetermined opening degree is at least 150% of the set opening degree, namely, more than half of the movement amount from the fully opened state of the shut-off valve 1 to the set opening degree. That is, the microcomputer 7 causes in the first operation the shut-off valve 1 to be closed more frequently than the second and subsequent operations among opening and closing the solenoid valve 5 (electromagnetic valve) a plurality of times.

As a result of step S306, when the predetermined opening degree has not been reached (step S307: the predetermined opening has not been reached), the process returns to step S305, and the loop of steps S305 to S307 is repeated until the predetermined opening degree is reached.

On the other hand, when the predetermined opening degree is reached as a result of step S306 (step S307: the predetermined opening degree is reached), the shut-off valve 1 is stopped (step S308). Specifically, the microcomputer 7 causes the solenoid C of the small flow rate three-way solenoid valve 5B de-energized, and all the three ports are closed in an all-port block state. Then, both the supply and discharge of air are stopped, so the cylinder 31 and the shut-off valve 1 are delayed and stopped.

Next, the solenoid valve 5 is turned on for a short time (step S309), the detection value (actual opening degree) of the opening sensor 8 is held in the internal memory or the like (step S310), and whether the detected value has reached the set opening degree is checked (step S311). Turning on the solenoid valve 5 means that the microcomputer 7 energizes the solenoid C of the small flow three-way solenoid valve 5B. In this way, the air in the cylinder 31 is exhausted from the outlet port OUT of the solenoid valve 5 to the atmosphere from the common exhaust port EXH via the small flow rate three-way solenoid valve 5B, and the spring load causes the piston 34 to slide from left to right. Further, the short time is a time in which the opening degree of the shut-off valve 1 is closed by a small amount (about several %). That is, in step S309, the shut-off valve 1 is finely operated by turning on the solenoid valve 5 for a short time.

The set opening degree checked in step S311 is not necessarily limited to the same value as the set opening degree, and may be in a predetermined range (for example, ±several %) centered on the set opening degree.

As a result of step S311, when the opening degree has not reached (step S312: the opening degree has not reached), the process returns to step S309, and the solenoid valve 5 is turned on for a short time again.

On the other hand, when the set opening degree is reached as a result of step S311 (step S312: reached the setting opening degree), the allowable time until reaching the set opening degree is compared (checked) with the elapsed time from the start of closing the shut-off valve in step S303 to the present time (step S313). Note that the allowable time of this embodiment is a time different from that of the first embodiment, and is a time taking into consideration that the predetermined opening degree of step S306 and step S309 have been performed a plurality of times.

Figure 13:
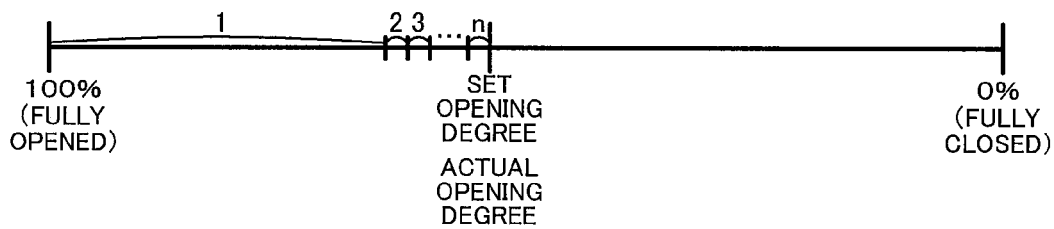
FIG. 13 is an explanatory view explaining an operation principle of a valve control device according to the third embodiment of the present invention.

That is, in the present embodiment, the solenoid valve 5 is operated a plurality of times such that the opening degree of the shut-off valve approaches the set opening degree (see FIG. 13). Although the number of times is n in FIG. 13, the number of times varies depending on the characteristics of the shut-off valve 1, the opening degree of the first time, and the time for which the solenoid valve 5 is turned on for a short time after the second time, and the like.

As a result of comparison in step S313, when the allowable time is exceeded (step S314: exceeding the allowable time), the test result is held in the memory in the microcomputer 7 (step S322) and the test is completed. On the other hand, as a result of comparison in step S313, when the allowable time is not exceeded (step S314: not exceeding the allowable time), the shut-off valve 1 is opened (step S315).

When step S315 is executed, the microcomputer 7 brings the solenoid C into a power stop state, and brings the solenoid D into an energized state. Then, the air from the air supply source 11 is supplied from the common inlet port IN of the solenoid valve 5 via the small flow rate three-way solenoid valve 5B to the cylinder 31 from the inlet 36 via the common outlet port OUT. The piston 34 slides in the left direction, and the shut-off valve 1 goes to the fully opened state.

Next, the allowable time from the predetermined opening degree to the fully opened state is read from the internal memory or the like (step S316). The current detection value of the OUT side pressure sensor 6B and the detection value of the opening degree sensor 8 are held in the internal memory or the like (step S317). The allowable time until full opening is compared with (checked) the elapsed time from when the opening of the shut-off valve is started in step S215 to the present time (step S318).

As a result of comparison in step S318, when the allowable time is exceeded (step S319: exceeding the allowable time), the test result is held in the memory in the microcomputer 7 (step S322) and the test is completed. On the other hand, as a result of comparison in step S316, if the allowable time is not exceeded (step S319: not exceeding the allowable time), whether the shut-off valve 1 is fully opened again is checked (step S320).

Next, as a result of checking whether the shut-off valve 1 is fully opened again in step S320, if not fully opened (step S321: not fully opened), the process returns to step S317 and executes step S317 and subsequent steps again. On the other hand, as a result of checking whether the shut-off valve 1 is fully opened again in step S320, when it fully opened (step S321: fully opened), the test result is held in the memory in the microcomputer 7 (step S322) to complete the test.

Therefore, step S300 functions as a set opening degree acquisition process, step S305 functions as an opening degree detection process, and steps S306 and S307 function as a control process.

According to the present embodiment, the opening degree sensor 8 for detecting the opening degree of the shutoff valve 1 is provided, and the microcomputer 7 controls the solenoid valve 5 to close multiple times so as to approach the set opening degree based on the detection value of the opening degree sensor 8. Therefore, for example, by operating finely in the vicinity of the set opening degree, it is possible to gradually adjust the actual opening degree to be the set opening degree. Therefore, the deviation between the set opening degree and the actual opening degree can be reduced. In addition, since it can be realized only by electrical control, there is no need for a mechanical mechanism such as extending the needle under a predetermined condition to apply a brake, and the need for additional components for testing is not required.

Further, the microcomputer 7 causes the shut-off valve 1 to be closed more frequently in the first operation than the second and subsequent operations among opening and closing the solenoid valve 5 a plurality of times. Therefore, the number of times of opening and closing control of the solenoid valve 5 can be reduced as much as possible to shorten the test time.

Third Embodiment

Figure 14:
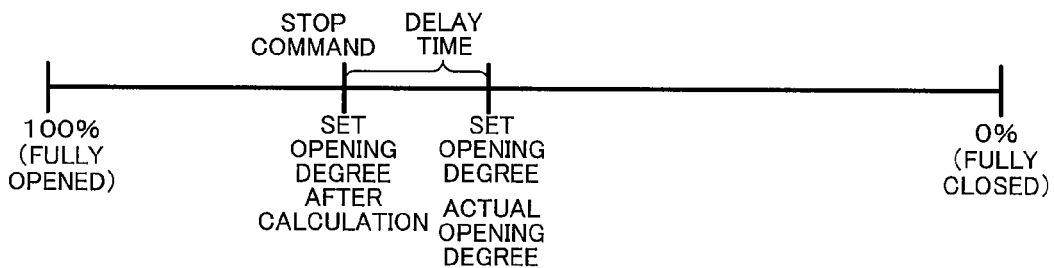
FIG. 14 is an explanatory view explaining an operation principle of a valve control device according to a fourth embodiment of the present invention.
Figure 15:
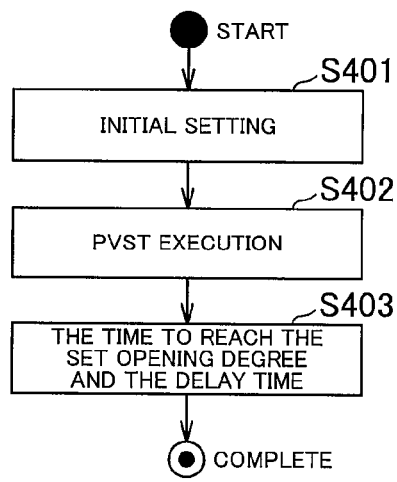
FIG. 15 is a flowchart of a time difference calculation operation of the valve control device according to the fourth embodiment of the present invention.

Next, a shut-off valve control system according to a fourth embodiment of the present invention will be described with reference to FIGS. 14 and 15. Incidentally, the same components as those in the first to third embodiments described above are denoted by the same reference signs and the description thereof will be omitted.

In the present embodiment, the configuration of the shut-off valve control system is the same as that shown in FIGS. 1 to 4. In the present embodiment, the delay time of the shut-off valve 1 with respect to the solenoid valve 5 is measured preliminary instead of the coefficient C preliminary calculated in the first embodiment, and the open/close control is performed based on the measurement result.

In the shut-off valve control device 100 having the configuration shown in FIG. 4, it is determined whether the microcomputer 7 has reached the set opening degree based on the detection result of the opening sensor 8. However, as described above, since the shut-off valve 1 has a slower reaction speed than the solenoid valve 5, even when the solenoid valve 5 is closed (all port block), a delay time occurs until the shut-off valve 1 is actually stopped. Therefore, in the present embodiment, the time to reach the set opening degree and the above-mentioned delay time are measured preliminary, and the solenoid valve 5 is closed in the time obtained by subtracting the delay time from the time to reach the measured set opening degree (see FIG. 14). A flowchart (time acquisition process) for measuring the delay time in the present embodiment is shown in FIG. 15. The flowchart shown in FIG. 15 is executed by the microcomputer 7.

First, as an initial setting, the solenoid valve 5 is operated to cause the microcomputer 7 to recognize the detection values of the opening degree sensor 8 when the shut-off valve 1 is fully opened and fully closed (step S401). Next, PVST is executed by the operation shown in FIG. 5 (step S402). It is preferable to perform this PVST a plurality of times by changing the set opening degrees, such as 80%, 60%, 40%, and 20%. Next, the time and delay time to reach the set opening degree are measured in the PVST executed in step S402 (step S403). That is, the microcomputer 7 functions as time acquisition means for acquiring the set opening degree of the shut-off valve 1 and the time when the shut-off valve 1 reaches the set opening degree.

Note that the PVST is executed at a plurality of set opening degrees in step S402 because the relationship between the time difference and the opening degree does not become proportional due to the difference in pressure applied to the cylinder 31 depending on the opening degree. That is, the delay time is measured preliminary for a plurality of opening degrees of the shut-off valve 1.

Then, when executing the flowchart of FIG. 5, when checking whether or not the set opening degree has been reached in step S106, whether or not the time obtained by subtracting the delay time from the time to reach the above-described measured set opening degree has elapsed is checked. That is, based on the delay time of the shut-off valve 1 with respect to the solenoid valve 5 (electromagnetic valve) measured preliminary, the microcomputer 7 operates the solenoid valve 5 (electromagnetic valve) until the time obtained by subtracting the delay time from the time when the shut-off valve 1 reaches the set opening degree. That is, steps S106 and S107 function as a control process.

Incidentally, it is practically difficult to measure the time to reach the setting opening degree and delay time measured preliminary with a fine opening degree such as every 1%. Therefore, as described above, measurement is made at every 20% or 10% opening degree, and when setting the opening degree between them, it may be estimated based on the arrival time or delay time close to the opening degree to be set. For example, in the case where the set opening degree is 25%, when the above 80%, 60%, 40%, and 20% are already calculated, estimation is performed based on the value of 20%.

According to the present embodiment, based on the delay time of the shut-off valve 1 with respect to the solenoid valve 5 measured preliminary, the microcomputer 7 controls the solenoid valve 5 to open until the time obtained by subtracting the delay time from the time when the shut-off valve 1 reaches the set opening degree. Thus, the microcomputer 7 can control in consideration of the delay of the operation of the shut-off valve 1. Therefore, the deviation between the set opening degree and the actual opening degree can be reduced. In addition, since it can be realized only by electrical control, there is no need for a mechanical mechanism such as extending the needle under a predetermined condition to apply a brake, and the need for additional components for testing is not required.

Moreover, since this time difference is measured preliminary for a plurality of opening degrees of the shut-off valve 1, it is possible to control with an appropriate delay time in response to the change in the operating speed of the shut-off valve 1 depending on the opening degree due to the pressure in the cylinder 31.

Fifth Embodiment

Next, a shut-off valve control system according to a fifth embodiment of the present invention will be described with reference to FIGS. 16 to 19. Incidentally, the same components as those in the first to fourth embodiments described above are denoted by the same reference signs, and the description thereof will be omitted.

Figure 16:
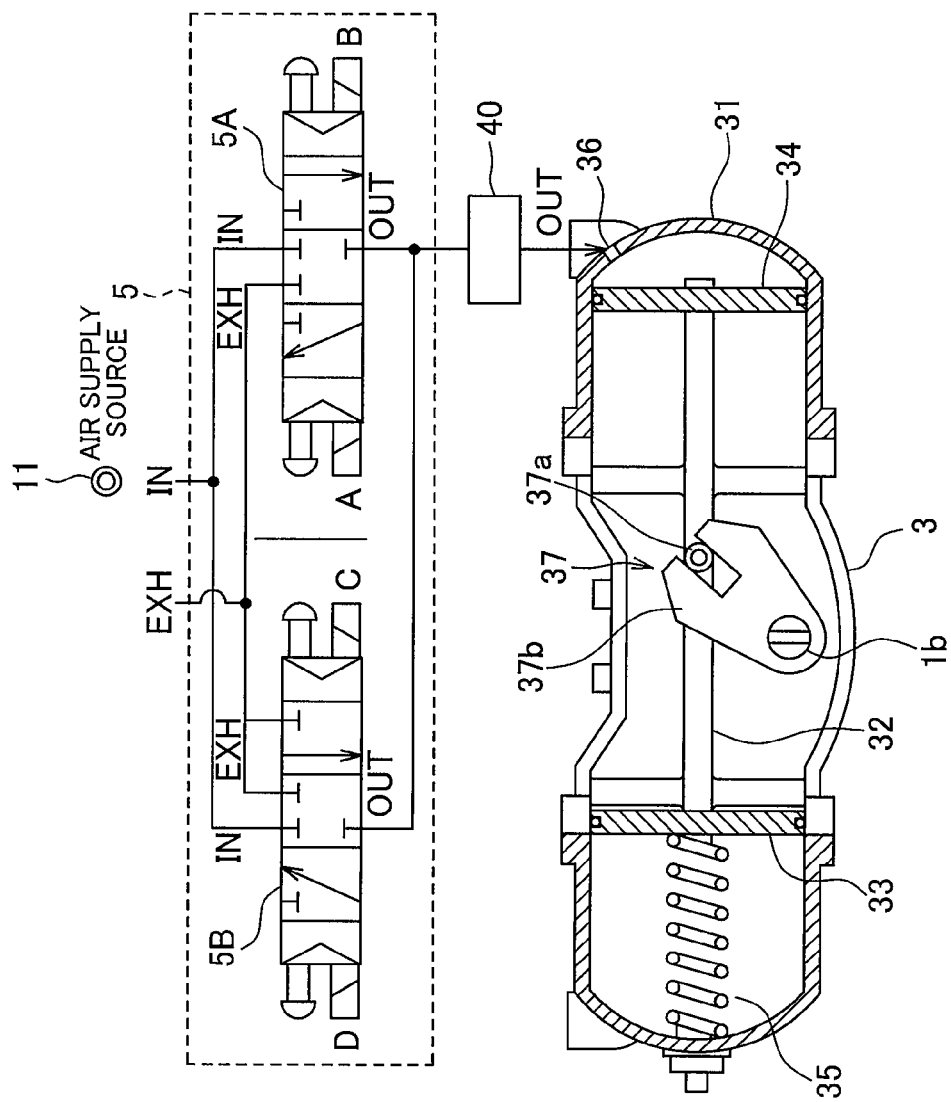
FIG. 16 is an explanatory drawing showing the structures of a solenoid valve and an air cylinder of a valve control system according to a fifth embodiment of the present invention.

The principal part block diagram of the shut-off valve control system according to the present embodiment is shown in FIG. 16. In the present embodiment, as shown in FIG. 16, a speed controller 40 as adjusting means is provided between the outlet port OUT of the solenoid valve 5 and the air inlet 36 of the air cylinder 3.

Figure 17:
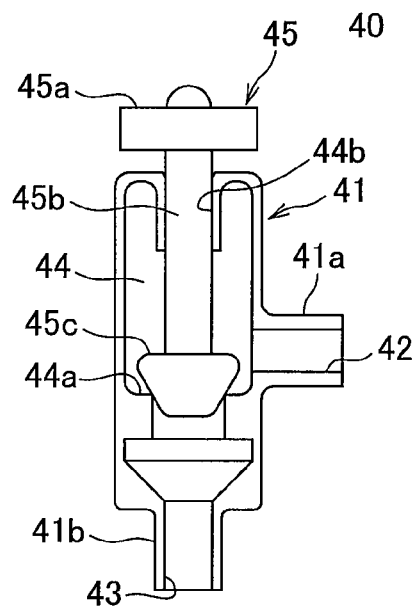
FIG. 17 is a cross-sectional view of a configuration of a speed controller shown in FIG. 16.

The speed controller 40 regulates the flow rate of air between the solenoid valve 5 and the air cylinder 3. The configuration of the speed controller 40 is shown in FIG. 17. Note that the speed controller is not limited to the configuration and the shape illustrated in FIG. 17 and the like, as long as it can adjust the air flow rate.

The speed controller 40 includes a substantially cylindrical main body portion 41 and an adjustment portion 45 inserted into the main body portion from one end of the main body portion 41. The main body portion 41 is provided with a first connection portion 41a protruding from a side surface portion of the cylinder and a second connection portion 41b formed at the other end portion of the main body portion 41. The second connection portion 41b is thinner than the cylindrical portion of the main body portion 41.

The first connection portion 41a is formed with a vent 42 through which air flows in or out from the outside. The second connection portion 41b is formed with a vent 43 through which air flows in or out from the outside. The vents 42 and the vents 43 communicate with an insertion hole 44 formed in the main body portion 41 so that air can be sucked and discharged between the vents 42 and the vents 43. In the insertion hole 44, a step portion 44a is formed in the vicinity of a connecting portion with the vent 42 at the vent 43 side, and a diameter of the insertion hole 44 is reduced. Further, a screw portion 44b is formed on one end side of the insertion hole 44, and is engaged with a screw portion 45b of the adjustment portion 45 described later.

The first connection portion 41a is connected to, for example, the air inlet 36 of the air cylinder 3, and the second connection portion 41b is connected to, for example, the outlet port OUT of the solenoid valve 5.

The adjustment portion 45 includes a knob portion 45a, the screw portion 45b, and a restricting portion 45c. The knob portion 45a is formed in a substantially disk shape, and provided at one tip end portion of the screw portion 45b exposed from the main body portion 41. The screw portion 45b is formed in a substantially round rod shape, and a screw groove is formed between the knob portion 45a and the restricting portion 45c. This screw groove engages with the screw portion 44b of the main body portion 41. The restricting portion 45c is provided at the other end of the screw 45b. That is, the restricting portion 45c is positioned in the main body portion 41 (in the insertion hole 44). Further, the restricting portion 45c has a frusto-conical shape which becomes thinner from the screw portion 45b toward the tip (in the direction of the vent 43). Therefore, the restricting portion 45c can stop the flow of air into and out of the vent 43 by the slope portion of the cone coming in contact with the step portion 44a described above.

Figure 18:
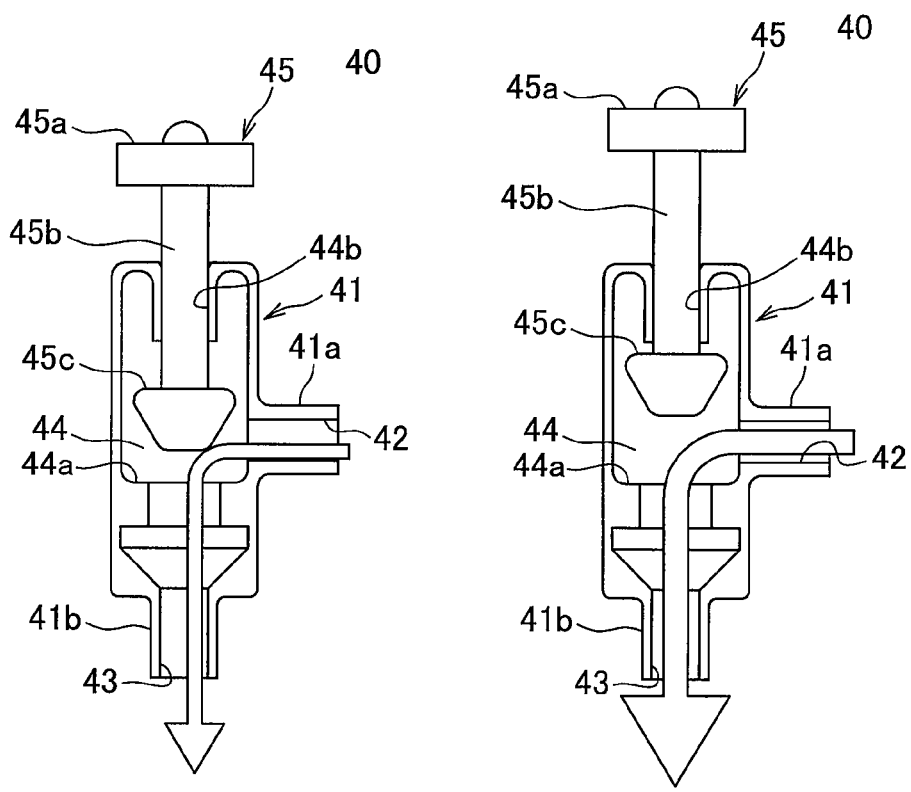
FIG. 18 is an operation explanatory drawing of the speed controller shown in FIG. 16.

The speed controller 40 having such a configuration rotates the knob 45a of the adjustment portion 45 so as to twist the adjustment portion 45 into the main body portion 41 to reduce the protrusion amount from the main body 41 as shown on the left side of FIG. 18. Then, in the insertion hole 44, the restricting portion 45c moves in the direction approaching the step 44a. Then, the distance between the restricting portion 45c and the step portion 44a becomes narrowed, and the amount of air flowing from the vent 42 is restricted. Therefore, adjustment can be made to reduce the amount of air flowing between the vents 42 and 43.

On the other hand, as shown on the right side of FIG. 18, the knob 45a of the adjustment portion 45 is rotated to increase the protrusion amount of the adjustment unit 45 from the main body 41. Then, the restricting portion 45c moves in the insertion hole 44 in a direction away from the step portion 44a. Then, the distance between the restricting portion 45c and the insertion hole 44 becomes wide, and the amount of air flowing in from the air vent 42 increases. Therefore, adjustment can be made to increase the amount of air flowing between the vents 42 and 43.

Thus, the speed controller 40 can adjust the amount of air flowing between the vent 42 and the vent 43 by rotating the knob 45a of the adjustment portion 45. The adjusting portion 45 is engaged with the main body portion 41 (the screw portion 44b) by the screw portion 45b, so that the position of the regulating portion 45c can be fixed at any position.

In the present embodiment, the speed controller 40 configured as described above is provided between the outlet port OUT of the solenoid valve 5 and the air inlet 36 of the air cylinder 3, so that the amount of air discharged from the air cylinder 3 can be reduced and the operating speed of the cylinder 31 is restricted.

Figure 19:
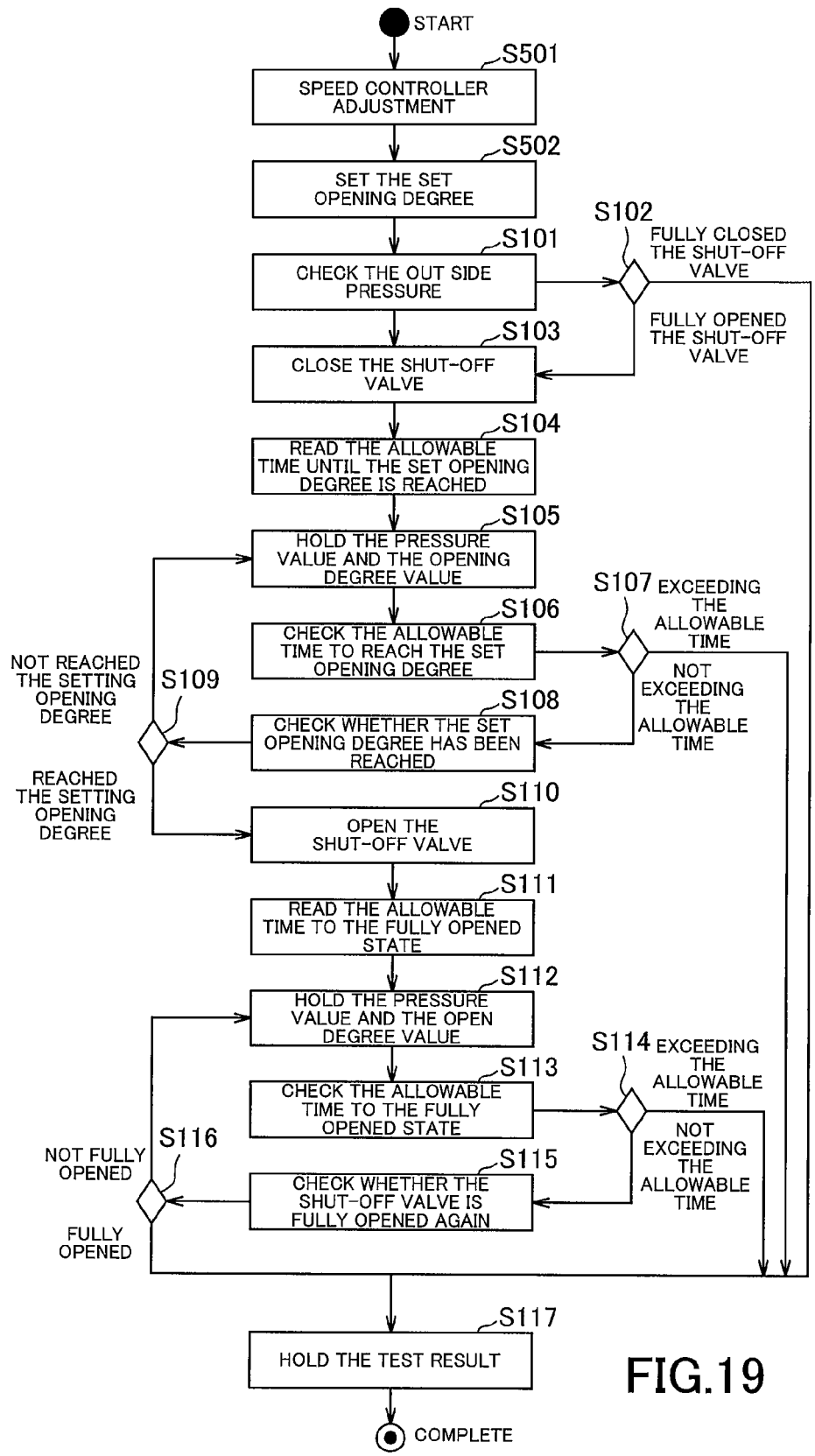
FIG. 19 is a flowchart of an operation at the time of a setting operation test (PVST) including prediction of a failure of the valve control device according to the fifth embodiment of the present invention.

FIG. 19 shows a flowchart of an operation (a test method of the shut-off valve control system) at the time of operation test (PVST) at the time of setting including prediction of failure according to the present embodiment. Steps S501 and S502 are added to the flowchart shown in FIG. 19 before the flowchart shown in FIG. 5.

In step S501, the speed controller 40 is adjusted. For example, the amount of air exhausted from the air cylinder 3 is narrowed by the speed controller 40 to reduce the amount of exhaust air. Next, in step S502, the set opening degree is set, and thereafter, the flowchart proceeds as described in FIG. 5.

That is, step S501 is an adjustment process, step S502 is an opening degree setting process, and steps S101 to S117 are operation test processes.

Incidentally, in order to adjust the speed controller 40 a plurality of times, the flowchart shown in FIG. 19 may be executed a plurality of times.

According to the present embodiment, the speed controller 40 for adjusting the flow rate of air is provided between the solenoid valve 5 and the air cylinder 3. Therefore, by throttling the amount of air discharged from the air cylinder 3 by the speed controller 40, the exhaust amount is controlled. Therefore, the operating speed of the cylinder 31 is limited, and the delay of the shut-off valve 1 is reduced. Therefore, the deviation between the set opening degree and the actual opening degree at the time of PVST execution can be reduced.

Note that the fifth embodiment described above can be combined with the first to fourth embodiments. When combined with the first and second embodiments, the speed controller 40 is provided between the solenoid valve 5 and the air cylinder 3, and the set opening degree is further changed by the coefficient C and the coefficients a and b. For example, since the opening and closing of the small diameter shut-off valve is very fast, in the case of the small diameter, the switching control at the set opening degree may not be successfully performed with only the coefficient C and the coefficients a and b. Therefore, by attaching the speed controller 40, the PVST can be performed with high accuracy by adjusting the open/close speed.

Next, in combination with the third embodiment, the speed controller 40 is provided between the solenoid valve 5 and the air cylinder 3, and furthermore, the opening and closing operation of the solenoid valve 5 is performed a plurality of times to gradually approach the set opening degree. In this case also, in the small diameter shut-off valve, the opening/closing speed is adjusted by the speed controller 40 so that PVST can be performed with high accuracy.

Then, in combination with the fourth embodiment, the speed controller 40 is provided between the solenoid valve 5 and the air cylinder 3 and further the solenoid valve 5 is controlled based on the measured delay time. In this case also, in the small diameter shut-off valve, the PVST can be performed with high accuracy by controlling the solenoid valve 5 based on the time when the opening/closing speed is adjusted by the speed controller 40.

Further, the above-described embodiments only show typical forms of the present invention, and the present invention is not limited to these embodiments. That is, those skilled in the art can carry out various modifications without departing from the gist of the present invention in accordance with conventionally known findings. As long as the configuration of the valve control device of the present invention is provided even after such a modification, it is of course included in the scope of the present invention.

REFERENCE SIGNS LIST

1 Shut-off valve (valve)
1b Valve shaft
3 Air cylinder
5 Solenoid valve (electromagnetic valve)
7 Micro controller (control means, set opening degree acquisition means, time acquisition means)
8 Opening degree sensor (opening degree detection means)
11 Air supply source
31 Cylinder
40 Speed controller
100 Shut-off valve control device (valve control device)

The invention claimed is:

1. A valve control device provided with control means for controlling an electromagnetic valve that supplies and exhausts air from an air supply source to a cylinder of an air cylinder that controls a valve shaft of a valve, comprising:
set opening degree acquisition means for acquiring a set opening degree of the valve; and
opening degree detecting means for detecting an opening degree of the valve,
wherein the control means operates the electromagnetic valve until the opening degree detected by the opening degree detection means becomes a value obtained by calculating the set opening degree based on a predetermined coefficient calculated based on a deviation between an actual opening degree of the valve and the set opening degree.

2. The valve control device as claimed in claim 1, wherein the control means operates the electromagnetic valve until the opening degree detected by the opening degree detection means becomes a value obtained by dividing the set opening degree by the predetermined coefficient.

3. The valve control device as claimed in claim 1, wherein the control means operates the electromagnetic valve until the opening degree detected by the opening degree detection means becomes a value determined by an equation based on a predetermined coefficient.

4. The valve control device as claimed in claim 3, wherein the coefficient is the coefficient based on a least square method calculated by the actual opening degree of the valve and the set opening degree.

5. A valve control system provided with the valve, the air cylinder for controlling rotation of the valve shaft of the valve, and the electromagnetic valve for supplying and exhausting air from the air supply source to the cylinder of the air cylinder, comprising:
the valve control device as claimed in claim 1.

6. The valve control system as claimed in claim 5, wherein adjustment means for adjusting a flow rate of the air is provided between the electromagnetic valve and the air cylinder.

7. A valve control coefficient calculation method of calculating a coefficient by controlling means for controlling an electromagnetic valve that supplies and exhausts air from an air supply source to a cylinder of an air cylinder that controls a valve shaft of a valve, comprising the steps of:
a preliminary operation step for operating the valve to a predetermined set opening degree;
an actual opening degree detection step for detecting an actual opening degree of the valve in the preliminary operation step;
a deviation calculation step for calculating a deviation of the set opening degree and the actual opening degree; and
a coefficient calculation step for calculating the coefficient based on the deviation calculated in the deviation calculation step.

8. A valve control coefficient calculation method of calculating a coefficient by controlling means for controlling an electromagnetic valve that supplies and exhausts air from an air supply source to a cylinder of an air cylinder that controls a valve shaft of a valve, comprising the steps of:
a preliminary operation step for operating the valve to a predetermined set opening degree;
an actual opening degree detection step for detecting an actual opening degree of the valve in the preliminary operation step; and
a coefficient calculation step for calculating the coefficient based on a least square method calculation based on a deviation between the actual opening degree of the valve and the setting opening degree.

9. The valve control coefficient calculation method as claimed in claim 7,
wherein the preliminary operation step is performed for each of a plurality of set opening degrees.

10. The valve control coefficient calculation method as claimed in claim 8,
wherein the preliminary operation step is performed for each of a plurality of set opening degrees.

11. A valve control method of a valve control device provided with a control device for controlling an electromagnetic valve for supplying and exhausting air from an air supply source to a cylinder of an air cylinder for controlling a valve shaft of a valve, comprising the steps of:
a set opening degree acquisition step for acquiring a set opening degree of the valve;
an opening degree detection step for detecting an opening degree of the valve; and
a control step for operating the electromagnetic valve until the opening degree detected in the opening degree detection step becomes a value obtained by calculating the set opening degree based on a predetermined coefficient calculated based on a deviation between an actual opening degree of the valve and the set opening degree.

12. The valve control coefficient calculation method as claimed in claim 7,
   wherein the preliminary operation step operates the valve to the set opening degree a plurality of times per one set opening degree.

13. The valve control coefficient calculation method as claimed in claim 8,
   wherein the preliminary operation step operates the valve to the set opening degree a plurality of times per one set opening degree.

14. The valve control coefficient calculation method as claimed in claim 9,
   wherein the preliminary operation step operates the valve to the set opening degree a plurality of times per one set opening degree.

15. The valve control coefficient calculation method as claimed in claim 10,
   wherein the preliminary operation step operates the valve to the set opening degree a plurality of times per one set opening degree.

\* \* \* \* \*